US008106871B2

(12) United States Patent
Tung et al.

(10) Patent No.: US 8,106,871 B2
(45) Date of Patent: Jan. 31, 2012

(54) LIQUID CRYSTAL DISPLAY AND DRIVING METHOD THEREOF

(75) Inventors: Chien-Fan Tung, Miao-Li (TW); Shun-Ming Huang, Shenzhen (CN); Sha Feng, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 778 days.

(21) Appl. No.: 12/005,726

(22) Filed: Dec. 28, 2007

(65) Prior Publication Data

US 2008/0158126 A1 Jul. 3, 2008

(30) Foreign Application Priority Data

Dec. 29, 2006 (TW) .............................. 95149685 A

(51) Int. Cl.
*G09G 3/36* (2006.01)
*G09G 5/00* (2006.01)
*G06F 3/038* (2006.01)

(52) U.S. Cl. ............................ 345/98; 345/92; 345/204

(58) Field of Classification Search .............. 345/87–98, 345/204, 208–210, 690
See application file for complete search history.

(56) References Cited

U.S. PATENT DOCUMENTS 7,224,353 B2 * 5/2007 Song et al. ...................... 345/98
2002/0008688 A1 * 1/2002 Yamamoto et al. ............. 345/98
2005/0024353 A1 * 2/2005 Amundson et al. ........... 345/204
2005/0140625 A1 * 6/2005 Kim et al. ....................... 345/89
2005/0195149 A1 * 9/2005 Ito .................................. 345/98
2005/0231491 A1 * 10/2005 Yeh .............................. 345/204
2005/0270262 A1 * 12/2005 Oh ................................ 345/89
2006/0050042 A1 3/2006 Yi
2006/0158413 A1 * 7/2006 Morita ........................... 345/94
2007/0126687 A1 * 6/2007 Choi .............................. 345/98

FOREIGN PATENT DOCUMENTS

CN 1588529 A 3/2005

* cited by examiner

*Primary Examiner* — Bipin Shalwala
*Assistant Examiner* — Ryan A Lubit
(74) *Attorney, Agent, or Firm* — Altis Law Group, Inc.

(57) ABSTRACT

A liquid crystal display (1) includes a liquid crystal panel (12) including a number of thin film transistors (123), a timing control circuit (16), a common voltage generating circuit (14) and a gamma circuit (13). The timing control circuit is configured for generating timing signals. The common voltage generating circuit is configured for generating a common voltage. The gamma circuit is configured for generating gray-scale voltages. When the liquid crystal panel is powered on, the common voltage is applied to the liquid crystal panel and reaches a predetermined value before the gray-scale voltages are applied to the liquid crystal panel and comes to predetermined values. And when liquid crystal panel is powered off the common voltage and the gray-scale voltages drops to 0V simultaneously by control of the common voltage generating circuit and the gamma circuit with the thin film transistors switched on.

20 Claims, 4 Drawing Sheets

LIQUID CRYSTAL DISPLAY AND DRIVING METHOD THEREOF

FIELD OF THE INVENTION

The present invention relates to liquid crystal displays (LCDs) and particularly relates to a liquid crystal display that can eliminate flicker effect when switched on and can eliminate residual image effect when switched off, and a driving method of the liquid crystal display.

GENERAL BACKGROUND

A liquid crystal display has the advantages of portability, low power consumption, and low radiation, and has been widely used in various portable information products such as notebooks, personal digital assistants (PDAs), video cameras and the likes. The liquid crystal display generally includes a liquid crystal panel and a backlight module opposite to the liquid crystal panel. The liquid crystal panel includes a plurality of pixel units for displaying images.

Referring to FIG. 5, this is a circuit diagram of a pixel unit 5 of a typical liquid crystal display (not labeled). The pixel unit 5 includes a gate line 51, a data line 52, a thin film transistor 53, a pixel electrode 54, a common electrode 55 and a liquid crystal layer (not shown) sandwiched between the pixel electrode 54 and the common electrode 55. The thin film transistor 53 includes a gate electrode 531 coupled to the gate line 51, a source electrode 532 coupled to the data line 52, and a drain electrode 533 coupled to the pixel electrode 54. The pixel electrode 54, the common electrode 55 and the liquid crystal layer cooperatively form a liquid crystal capacitor 50.

Typically, the common electrode 55 is applied with a predetermined common voltage $V_{com}$, and the pixel electrode 54 is applied with a gray-scale voltage $V_d$. The common voltage $V_{com}$ of the common electrode 55 and the gray-scale voltage $V_d$ of the pixel electrode 54 generate an electric field. The strength of the electrical field controls an amount of light beams transmitting through the liquid crystal capacitor 50. Thus, the pixel unit 5 displays an image with a desire gray-scale level. Generally, the gray-scale voltage of the pixel electrode 54 is switched from a positive value to a negative value with respect to the common voltage $V_{com}$ of the common electrode 55, in order to avoid deterioration of the liquid crystal layer.

Referring to FIG. 6, a sequence waveform diagram of the gray-scale voltage and the common voltage is shown. When the pixel unit 5 is switched on, the gray-scale voltage $V_d$ is generated earlier than the common voltage $V_{com}$. When the gray-scale voltage $V_d$ is applied to the pixel electrode 54, the common voltage $V_{com}$ is still rising and does not reach a predetermined value. Thus, a voltage difference between the common electrode 55 and the pixel electrode 54 varies during a preliminary period after the pixel unit 5 is switched on. Thus, the amount of transmission light beams varies during this period. Therefore, the viewer can feel flickering.

Furthermore, when the liquid crystal display is powered off, the pixel unit 5 is switched off, and the common voltage $V_{com}$ slowly drops to 0V. Thus, the voltage difference still exists between the common electrode 55 and the pixel electrode 54, and the electric field still exists for allowing the amount of transmission of light beams. Therefore, a residual image is induced.

What is needed, therefore, is a liquid crystal display which can overcome the above-described deficiencies. What is also needed, is a driving method of such liquid crystal display.

SUMMARY

An exemplary liquid crystal display includes a liquid crystal panel including a number of thin film transistors, a timing control circuit, a common voltage generating circuit and a gamma circuit. The timing control circuit is configured for generating a number of timing signals. The common voltage generating circuit is configured for generating a common voltage. The gamma circuit is configured for generating a plurality of gray-scale voltages. When the liquid crystal panel is powered on, the common voltage is applied to the liquid crystal panel and comes to a predetermined value before the gray-scale voltages are applied to the liquid crystal panel and reaches predetermined values. And when liquid crystal panel is powered off, the common voltage and the gray-scale voltages drops to 0V simultaneously by control of the common voltage generating circuit and the gamma circuit with the thin film transistors switched on.

Novel features and advantages of the liquid crystal display will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
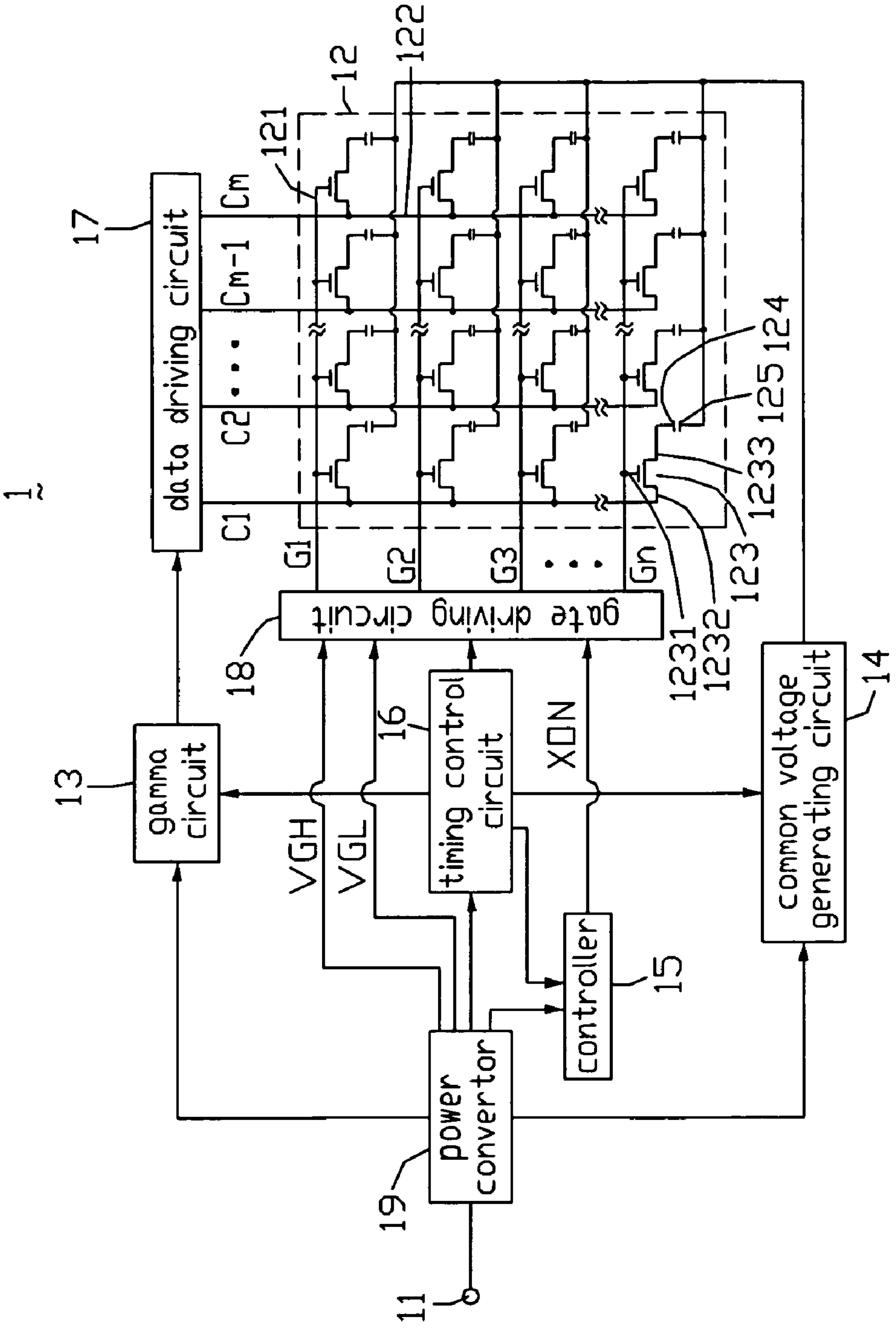
FIG. 1 is essentially an abbreviated circuit diagram of a liquid crystal display according to a preferred embodiment of the present invention, the liquid crystal display including a plurality of pixel units, each pixel unit including a thin film transistor.

Referring to FIG. 1, a liquid crystal display 1 according to a preferred embodiment of the present invention is shown. The liquid crystal display 1 includes a power source 11, a liquid crystal panel 12, a gamma circuit 13, a common voltage generating circuit 14, a controller 15, a timing control circuit 16, a data driving circuit 17, a gate driving circuit 18 and a power convertor 19.

The liquid crystal panel 12 includes a plurality of gate lines 121 that are parallel to each other and that extend along a first direction, a plurality of data lines 122 that are parallel to each other and that extend along a second direction orthogonal to the first direction, a plurality of thin film transistors 123 that are provided in the vicinity of points of intersections of the gate lines 121 and the data lines 122 and function as switching elements, a plurality of pixel electrodes 124, a common electrode 125 opposite to the pixel electrodes 124, and a liquid crystal layer (not shown) sandwiched between the pixel electrodes 124 and the common electrode 125. Each thin film transistor 123 includes a gate electrode 1231 coupled to one corresponding gate line 121, a source electrode 1232 coupled to one corresponding data line 122, and a drain electrode 1233 coupled to one corresponding pixel electrode 124. A smallest area formed by every adjacent two data lines 122 and every adjacent two gate lines 121 is defined as a pixel unit (not labeled).

The power convertor 19 includes an input terminal (not labeled) coupled to the power source 11, a first output terminal (not labeled) coupled to the timing control circuit 16, a second output terminal (not labeled) coupled to the common voltage generating circuit 14, a third output terminal (not labeled) coupled to the gamma circuit 13, a fourth output terminal (not labeled) coupled to the controller 15, a fifth output terminal (not labeled) coupled to the gate driving circuit 18, and a sixth output terminal (not labeled) coupled to the gate driving circuit 18.

The power convertor 19 is configured for generating working voltages for the timing control circuit 16, the common voltage generating circuit 14, the gamma circuit 13, and the controller 15, and generating a switch-on voltage $V_{GH}$ and a switch-off voltage $V_{GL}$ of the thin film transistors 123 for the gate driving circuit 18. The switch-on voltage $V_{GH}$ is a high level voltage, and the switch-off voltage $V_{GL}$ is a low level voltage.

The timing control circuit 16 includes an input terminal (not labeled) coupled to the power convertor 19 for receiving a working voltage, a first control terminal (not labeled) coupled to the common voltage generating circuit 14, a second control terminal (not labeled) coupled to the gamma circuit 13, a third control terminal (not labeled) coupled to the controller 15, and a fourth control terminal (not labeled) coupled to the gate driving circuit 18. The timing control circuit 16 is configured for generating a common voltage timing control signal for the common voltage generating circuit 14, generating a gray-scale voltage timing control signal for the gamma circuit 13, and generating a plurality of other timing control signals for the controller 15 and the gate driving circuit 18.

The common voltage generating circuit 14 includes a first input terminal (not labeled) coupled to the power convertor 19 for receiving a working voltage, a second input terminal (not labeled) coupled to the timing control circuit 16, and an output terminal (not labeled) coupled to the common electrode 125. The common voltage generating circuit 14 is configured for generating a common voltage $V_{com}$ and providing the common voltage $V_{com}$ to the common electrode 125 according to the common voltage timing control signal of the timing control circuit 16.

The gamma circuit 13 includes a third input terminal (not labeled) coupled to the power convertor 19 for receiving a working voltage, a fourth input terminal (not labeled) coupled to the timing control circuit 16, and an output terminal coupled to the data driving circuit 17. The gamma circuit 13 is configured for generating a gray-scale voltage $V_d$, and providing the gray-scale voltages to the data driving circuit 17 according the gray-scale voltage timing control signal of the timing control circuit 16.

The controller 15 includes a fifth input terminal (not labeled) coupled to the power convertor 19 for receiving a working voltage, a sixth input terminal (not labeled) coupled to the timing control circuit 16, and an output terminal (not labeled) coupled to the gate driving circuit 18. The controller 15 is configured for generating a control signal $X_{on}$ for the gate driving circuit 18 according to a timing control signal of the time control circuit 16. The control signal $X_{on}$ can be a high level voltage or a low level voltage.

The gate driving circuit 18 includes a seventh input terminal (not labeled) coupled to the timing control circuit 16, an eighth input terminal (not labeled) coupled to the controller 15, a ninth input terminal (not labeled) coupled to the power convertor 19 to receive the switch-on voltage $V_{GH}$, a tenth input terminal (not labeled) coupled to the power convertor 19 to receive the switch-off voltage $V_{GL}$, and a plurality of output terminals (not labeled) respectively coupled to the gate lines 121. The gate driving circuit 18 is configured for generating a plurality of scanning signals for the gate lines 121 according to a timing control signal of the timing control circuit 16.

The data driving circuit 17 includes an input terminal (not labeled) coupled to the gamma circuit 13, and a plurality of output terminals (not labeled) respectively coupled to the data lines 122. The data driving circuit 17 is configured for applying the gray-scale voltages to the data lines 122, respectively.

Figure 2:
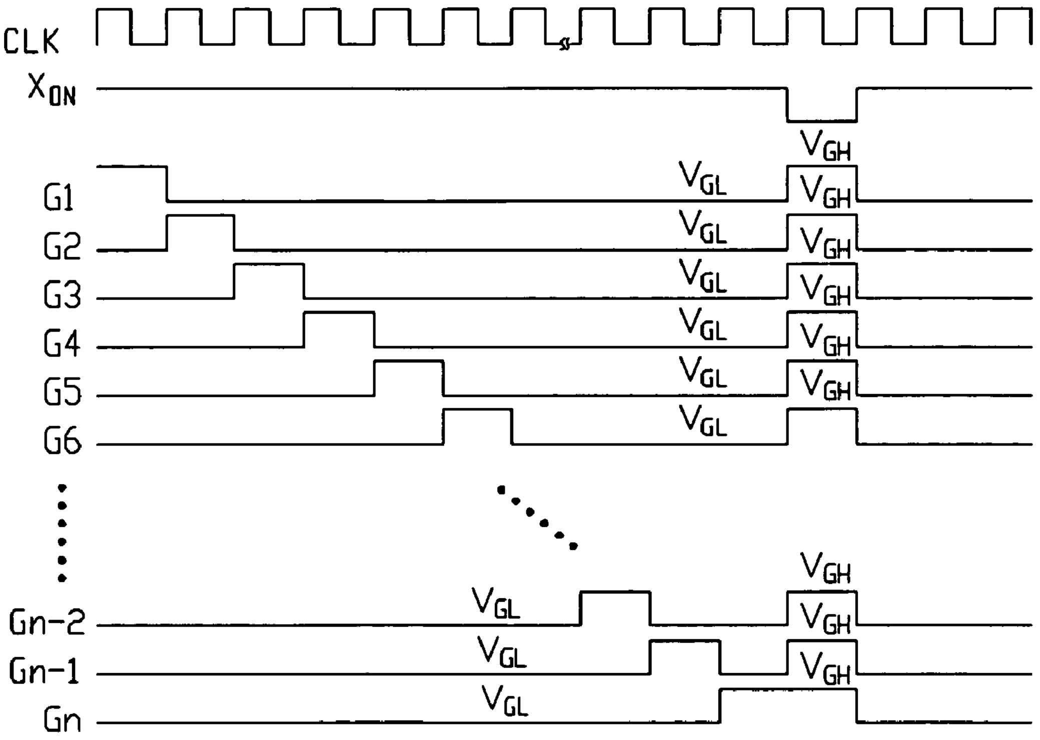
FIG. 2 is an abbreviated waveform diagram of driving signals of the liquid crystal display of FIG. 1.

Referring to FIG. 2, "CLK " represents a waveform of timing signal. "$X_{ON}$" represents a waveform of the control signal. "$G_1$-$G_n$" represents waveforms of the scanning signals applied to the gate lines 121. When the control signal $X_{ON}$ is a high level voltage, the gate driving circuit 18 sequentially applies the switch-on voltage $V_{GH}$ to the gate lines 121. When one gate line 121 is applied with the switch-on voltage $V_{GH}$, the thin film transistors 123 connected to the gate line 121 are switched on. And other gate lines 121 are applied with the switch-off voltage $V_{GL}$, and the thin film transistors 123 connected thereto are switched off.

When the control signal $X_{ON}$ is a low level voltage, the gate driving circuit 18 applies the switch-on $V_{GH}$ voltage to all the gate lines 121 simultaneously, and all the thin film transistors 123 are switched on.

When the thin film transistors 123 are switched on, the gray-scale voltages generated by the gamma circuit 13 are applied to the pixel electrodes 124 via the data driving circuit 17, the data lines 122, and the thin film transistors 123. The common electrode 125 is applied with the common voltage $V_{com}$. Thus, electric fields are generated between the common electrode 125 and the pixel electrodes 124, and the strength of the electric fields controls amounts of transmission light beams of the pixel units. The electric fields keep during a frame period.

Figure 3:
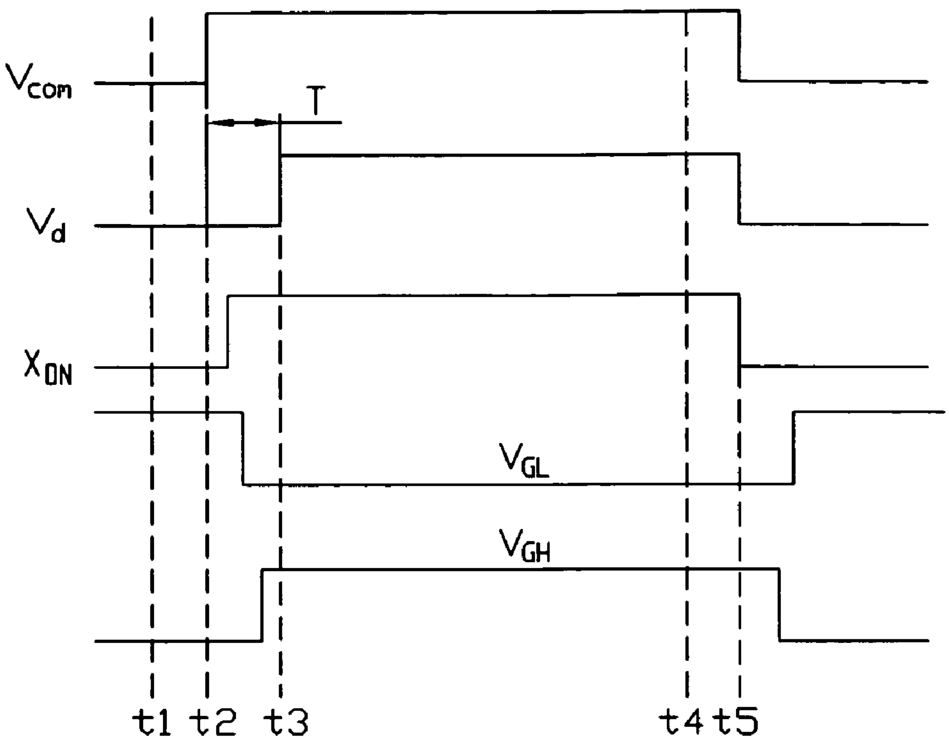
FIG. 3 is a sequence waveform diagram of a common voltage, a gray-scale voltage, a control signal, a switch-on voltage of the thin film transistor, and a switch-off voltage of the thin film transistor of one of the pixel units of FIG. 1.

Referring to FIG. 3, "$V_d$" represents the gray-scale voltage, "$V_{com}$" represents the common voltage, "$X_{ON}$" represents the control signal, "$V_{GH}$" represents the switch-on voltage of the thin film transistors 123, and "$V_{GL}$" represents the switch-off voltage of the thin film transistors 123. A driving method of the liquid crystal display 1 is as follows.

At a time t1, the liquid crystal display 1 is powered on. That is, the power source 11 is switched on.

At a time t2, the common voltage generating circuit 14 generates a common voltage $V_{com}$ according to the common voltage timing control signal of the timing control circuit 16, and outputs the common voltage $V_{com}$ to the common electrode 125.

At a time t3, the gamma circuit 13 generates a gray-scale voltage $V_d$ according to the gray-scale voltage timing control signal of the timing control circuit 16, and outputs the gray-scale voltage $V_d$ to the pixel electrode 124.

During a "T" period from t2 to t3, the common voltage $V_{com}$ is set at a predetermined value. The "T" period generally lasts about 10 ms to 30 ms. In the "T" period, the controller 15 generates the control signal $X_{ON}$ according to a timing control signal of the timing control circuit 16, and outputs the control signal $X_{ON}$ to the gate driving circuit 18. And the power convertor 19 generates the switch-on voltage $V_{GH}$ and the switch-off voltage $V_{GL}$ for the gate driving circuit 18.

After the time t3, the liquid crystal display 1 starts to work normally. The gate driving circuit 18 sequentially applies the switch-on voltage $V_{GH}$ to the gate lines 121, thus the thin film transistors 123 connected thereto are switched on. Then the gray-scale voltage $V_d$ generated by the gamma circuit 13 is applied to the pixel electrodes 124 via the data driving circuit 17, the data lines 122 and the switched on thin film transistors 123. The common electrode 125 is applied with the common voltage $V_{com}$. Thus, an electric field generates between the common electrode 125 and the pixel electrodes 124, and the strength of the electric fields controls amounts of transmission light beams of the pixel units. In the next frame periods, the steps are repeated.

At a time t4, the liquid crystal displayer 1 is powered off. That is, the power 11 is switched off, and a switch-off process is executed.

Figure 4:
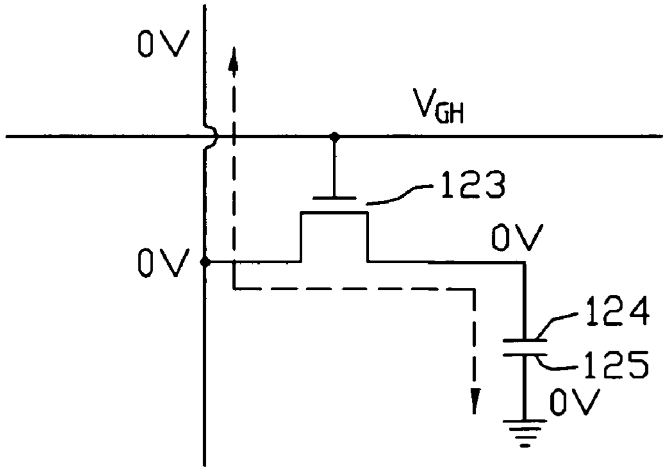
FIG. 4 is an equivalent circuit diagram of one pixel unit of FIG. 1.
Figure 5:
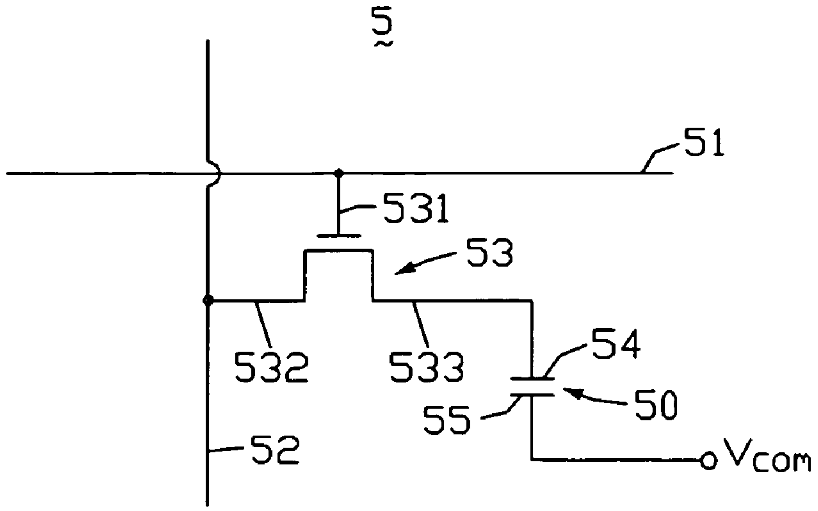
FIG. 5 (RELATED ART)
FIG. 5 is an equivalent circuit diagram of a pixel unit of a conventional liquid crystal display.
Figure 6:
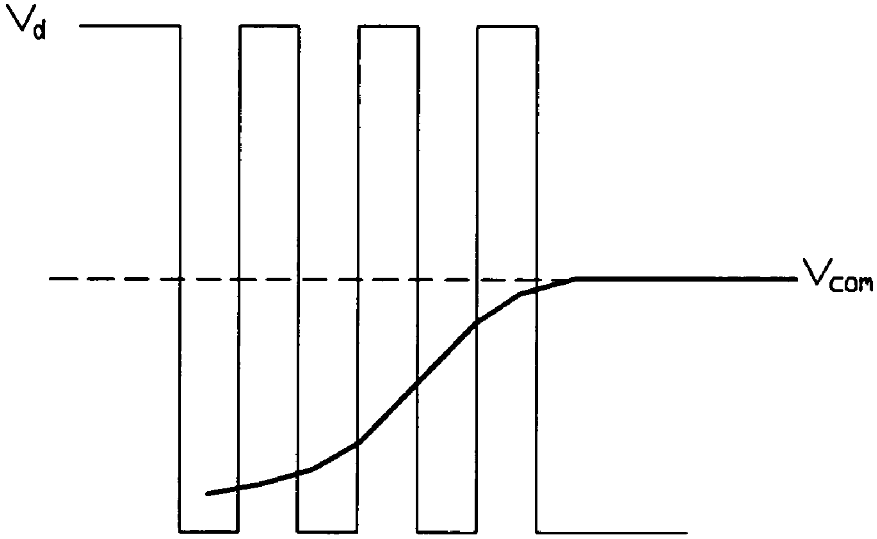
FIG. 6 (RELATED ART)
FIG. 6 is a sequence waveform diagram of a common voltage and a gray-scale voltage of the pixel unit of FIG. 5.

At a time t5, the common voltage $V_{com}$ and the gray-scale voltage $V_d$ simultaneously drop to 0V. The control signal $X_{ON}$ also drops to a low level voltage. The gate driving circuit 18 simultaneously applies the switch-on voltage $V_{GH}$ to all the gate lines 121, thus all the thin film transistors 123 are switched on. The voltages of the pixel electrodes 124 also drop to 0V with the dropping of the gray-scale voltages $V_d$. Therefore, voltages of the pixel electrodes 124 and the common electrode 125 all drop to 0V. Referring also to FIG. 4, charges stored between the common electrode 125 and one pixel electrode 124 are released via the thin film transistor 123, and no residual images are displayed.

Unlike conventional liquid crystal displays, when the liquid crystal display 1 is powered on, the common voltage $V_{com}$ is generated by the common voltage generating circuit 14 before the gray-scale voltage $V_d$ is generated. And the common voltage $V_{com}$ is applied to the common electrode 125 and reaches to a predetermined value before the gray-scale voltages $V_d$ are applied to the pixel electrodes 124. That is, voltage difference between the common electrode 125 and the pixel electrodes 124 do not vary, thus no flicker is induced. Furthermore, when the liquid crystal display 1 is powered off, the common voltage $V_{com}$ of the common electrode 125 and the gray-scale voltages $V_d$ of the pixel electrodes 124 drop to 0V simultaneously, and all the thin film transistors 123 are switched on. Therefore, charges stored between the common electrode 125 and the pixel electrodes 14 are released via the activated thin film transistors 123 quickly. Accordingly, no residual images are induced.

It is to be understood, however, that even though numerous characteristics and advantages of preferred embodiments have been set out in the foregoing description, together with details of the structures and functions of the embodiments, the disclosure is illustrative only; and that changes may be made in detail, especially in matters of shape, size, and arrangement of parts within the principles of the present invention to the full extent indicated by the broad general meaning of the terms in which the appended claims are expressed.

What is claimed is:

1. A liquid crystal display comprising:

a liquid crystal panel comprising a plurality of thin film transistors;

a timing control circuit configured for generating a plurality of timing signals;

a common voltage generating circuit configured for generating a common voltage according to the timing signals;

a gate driving circuit configured for receiving a switch-on voltage and a switch-off voltage, and generating a plurality of scanning signals based on the switch-on voltage and the switch-off voltage; and a gamma circuit configured for generating a plurality of gray-scale voltages according to the timing signals;

wherein during a time period after the liquid crystal display is powered on and before the liquid crystal display works normally, the common voltage is applied to the liquid crystal panel and reaches a predetermined value before the gray-scale voltages are applied to the liquid crystal panel, the switch-on voltage and the switch-off voltage both applied to the gate driving circuit in a time period after the common voltage reaches the predetermined value and before the gray-scale voltages are applied to the liquid crystal panel, and maintaining both of the switch-on and switch-off voltages to the gate driving circuit during a time period that the gray-scale voltages are applied to the liquid crystal panel, and the switch-off voltage is provided to the gate driving circuit before the switch-on voltage; and when the liquid crystal display is powered off, the common voltage and the gray-scale voltages drop to 0V simultaneously by control of the common voltage generating circuit and the gamma circuit with all the thin film transistors switched on.

2. The liquid crystal display as claimed in claim 1, further comprising a power convertor configured for generating a plurality of working voltages and outputting the working voltages to the timing control circuit, the gamma circuit and the common voltage generating circuit.

3. The liquid crystal display as claimed in claim 1, further comprising a controller configured for generating a first control signal for enabling the gate driving circuit to sequentially switch the thin film transistors on by outputting the scanning signals to the thin film transistors.

4. A driving method of a liquid crystal display, the liquid crystal display comprising a liquid crystal panel, a timing control circuit, a gate driving circuit, a gamma circuit and a common voltage generating circuit, the liquid crystal panel comprising a plurality of thin film transistors, the method comprising the following steps:

switching on the liquid crystal display;

generating a common voltage through the common voltage generating circuit, and outputting the common voltage to the liquid crystal panel, wherein during a time period after the liquid crystal display is switched on and before the liquid crystal display works normally, the common voltage reaches a predetermined value;

after the common voltage reaches the predetermined value, generating a plurality of gray-scale voltages through the gamma circuit, and outputting the gray-scale voltages to the liquid crystal panel;

in a time period after the common voltage reaches the predetermined value and before the gray-scale voltages are applied to the liquid crystal panel, start providing a switch-on voltage and a switch-off voltage to the gate driving circuit; maintaining providing the switch-on and switch-off voltages to the gate driving circuit during a time period that the gray-scale voltages are applied to the liquid crystal panel; and providing a plurality of scanning signals to the liquid crystal display by the gate driving circuit based on the switch-on voltage and the switch-off voltage, wherein the switch-off voltage is provided to the gate driving circuit before the switch-on voltage;

switching off the liquid crystal display, and switching on all the thin film transistors, and making the common voltage and the gray-scale voltages all drop to 0V substantially at the same time.

5. The driving method as claimed in claim 4, wherein the liquid crystal panel comprises a common electrode and a plurality of pixel electrodes opposite to the common electrode.

6. The driving method as claimed in claim 5, wherein the common voltage is applied to the common electrode 10 ms to 30 ms before the gray-scale voltages are applied to the pixel electrodes.

7. The driving method as claimed in claim 4, wherein the timing control circuit generates a plurality of timing control signals and outputting the timing control signals to common voltage generating circuit and the gamma circuit.

8. The driving method as claimed in claim 7, wherein, in the step of generating the common voltage, the timing control circuit generates a common voltage timing signal and outputs the common voltage timing signal to the common voltage generating circuit, and the common voltage generating circuit generates the common voltage accordingly.

9. The driving method as claimed in claim 8, wherein, in the step of making the common voltage and the gray-scale voltages all drop to 0V substantially at the same time, the common voltage generating circuit makes the common voltage drop to 0V according to the common voltage timing signal.

10. The driving method as claimed in claim 7, wherein, in the step of generating a plurality of gray-scale voltages through the gamma circuit and outputting the gray-scale voltages to the liquid crystal panel, the timing control circuit generates a gray-scale voltage timing control signal, and outputs the gray-scale voltage timing control signal to the gamma circuit.

11. The driving method as claimed in claim 10, wherein, in the step of generating a plurality of gray-scale voltages through the gamma circuit and outputting the gray-scale voltages to the liquid crystal panel, the gamma circuit generates the gray-scale voltage according to the gray-scale voltage timing control signal.

12. The driving method as claimed in claim 10, wherein, in the step of making the common voltage and the gray-scale voltages all drop to 0V substantially at the same time, the gamma circuit makes the gray-scale voltage drop to 0V according to the gray-scale voltage timing control signal.

13. The driving method as claimed in claim 7, wherein the liquid crystal display further comprises a controller, the liquid crystal panel comprises a plurality of gate lines, and in the time period after the common voltage reaches the predetermined value and before the gray-scale voltages are outputted to the liquid crystal panel, the controller applies a first control signal with a high level voltage to the gate driving circuit, so as to control the gate driving circuit to sequentially switch the thin film transistors on by sequentially outputting the switch-on voltage to the gate lines.

14. The driving method as claimed in claim 13, wherein the switch-on voltage is applied to the gate lines to switch on the thin film transistors connected thereto.

15. The driving method as claimed in claim 14, wherein when one gate line is applied with the switch-on voltage, the thin film transistors connected with the gate line are switched on.

16. The driving method as claimed in claim 13, wherein, in the step of switching on all the thin film transistors, the controller applies a second control signal with a low level voltage to the gate driving circuit, so as to control the gate driving circuit to switch all the thin film transistors on by simultaneously outputting the switch-on voltage to all the gate lines.

17. The liquid crystal display as claimed in claim 3, wherein the first control signal is also provided to the gate driving circuit in the time period after the common voltage reaches the predetermined value and before the gray-scale voltages are applied to the liquid crystal panel, and a time that the first control signal is provided to the gate driving circuit is previous to a time that the switch-off voltage is provided to the gate driving circuit.

18. The liquid crystal display as claimed in claim 17, wherein the control signal is also configured to provide a second control signal for enabling the gate driving circuit to simultaneously switch the thin film transistors on.

19. The liquid crystal display as claimed in claim 18, wherein the second control signal is provided to the gate driving circuit in a time instance when the common voltage and the gray-scale voltages both drop to 0V.

20. The liquid crystal display as claimed in claim 16, wherein the first control signal is applied to the gate driving circuit in the time period after the common voltage reaches the predetermined value and before the gray-scale voltages are applied to the liquid crystal panel, a time that the first control signal is provided to the gate driving circuit is previous to a time that the switch-off voltage is provided to the gate driving circuit, and the second control signal is provided to the gate driving circuit in a time instance when the common voltage and the gray-scale voltages both drop to 0V.

* * * * *